US006187866B1

(12) United States Patent
Jorgensen et al.

(10) Patent No.: US 6,187,866 B1
(45) Date of Patent: Feb. 13, 2001

(54) STAGED REACTOR PROCESS

(75) Inventors: Robert James Jorgensen, Belle Mead, NJ (US); Stephanie Marie Upham; James Daniel Madden, both of Charleston, WV (US); William James Michie, Jr., Raritan, NJ (US)

(73) Assignee: Union Carbide Chemicals & Plastics Technology Corporation, Danbury, CT (US)

( * ) Notice: Under 35 U.S.C. 154(b), the term of this patent shall be extended for 0 days.

(21) Appl. No.: 09/326,083

(22) Filed: Jun. 4, 1999

(51) Int. Cl.[7] ............... C08F 8/00; C08L 23/00
(52) U.S. Cl. ............ 525/197; 525/198; 525/240
(58) Field of Search .................................. 525/191, 197, 525/198, 240

(56) References Cited

U.S. PATENT DOCUMENTS

| 5,126,398 | 6/1992 | Lee et al. | 525/53 |
| 5,503,914 | 4/1996 | Michie, Jr. et al. | 428/220 |
| 5,665,818 | 9/1997 | Tilston et al. | 525/53 |

FOREIGN PATENT DOCUMENTS

| 0528523 | 2/1993 | (EP) . |
| 0533452 | 3/1993 | (EP) . |
| 0754708 | 1/1997 | (EP) . |
| 0778289 | 6/1997 | (EP) . |

*Primary Examiner*—Nathan M. Nutter
(74) *Attorney, Agent, or Firm*—Saul R. Bresch

(57) ABSTRACT

In a process for the in situ blending of polymers comprising contacting ethylene and one or more comonomers in two or more fluidized bed reactors with a catalyst system comprising (i) a magnesium/titanium based precursor containing an electron donor and (ii) a hydrocarbyl aluminum cocatalyst, the improvement comprising (A) increasing or decreasing the melt flow ratio and/or molecular weight of the blend by, respectively, decreasing or increasing the mole ratio of a precursor activator compound to the electron donor or (B) increasing or decreasing the bulk density of the blend by, respectively, increasing or decreasing the mole ratio of a precursor activator compound to the electron donor, both (A) and (B) subject to defined provisos including partial pre-activation of the precursor.

13 Claims, No Drawings

STAGED REACTOR PROCESS

TECHNICAL FIELD

This invention relates to a process for preparing an in situ polyethylene blend, which focuses on manipulation of properties.

BACKGROUND INFORMATION

There has been a rapid growth in the market for linear low density polyethylene (LLDPE), particularly resin made under mild operating conditions; typically at pressures of 100 to 400 psi and reaction temperatures of less than 120° C. This low pressure process provides a broad range of LLDPE products for blown and cast film, injection molding, rotational molding, blow molding, pipe, tubing, and wire and cable applications. LLDPE has essentially a linear backbone with only short chain branches, about 2 to 6 carbon atoms in length. In LLDPE, the length and frequency of branching, and, consequently, the density, is controlled by the type and amount of comonomer used in the polymerization. Although the majority of the LLDPE resins on the market today have a narrow molecular weight distribution, LLDPE resins with a broad molecular weight distribution are available for a number of non-film applications.

LLDPE resins designed for commodity type applications typically incorporate 1-butene as the comonomer. The use of a higher molecular weight alpha-olefin comonomer produces resins with significant strength advantages relative to those of ethylene/1-butene copolymers. The predominant higher alpha-olefin comonomers in commercial use are 1-hexene, 4-methyl-1-pentene, and 1-octene. The bulk of the LLDPE is used in film products where the excellent physical properties and drawdown characteristics of LLDPE film makes this film well suited for a broad spectrum of applications. Fabrication of LLDPE film is generally effected by the blown film and slot casting processes. The resulting film is characterized by excellent tensile strength, high ultimate elongation, good impact strength, and excellent puncture resistance.

These properties together with toughness are enhanced when the polyethylene is of high molecular weight. However, as the molecular weight of the polyethylene increases, the processability of the resin usually decreases. By providing a blend of polymers, the properties characteristic of high molecular weight resins can be retained and processability, particularly the extrudability (from the lower molecular weight component) can be improved.

The blending of these polymers is successfully achieved in a staged reactor process similar to those described in U.S. Pat. No. 5,047,468, 5,149,738 and 5,665,818. Briefly, the process is one for the in situ blending of polymers wherein a higher density ethylene copolymer is prepared in a high melt index reactor and a lower density ethylene copolymer is prepared in a low melt index reactor. The process typically comprises continuously contacting, under polymerization conditions, a mixture of ethylene and one or more alpha-olefins with a catalyst system in two gas phase, fluidized bed reactors connected in series, said catalyst system comprising: (i) a supported magnesium/titanium based catalyst precursor; (ii) an aluminum containing activator compound; and (iii) a hydrocarbyl aluminum cocatalyst, the polymerization conditions being such that an ethylene copolymer having a melt index in the range of about 0.1 to about 1000 grams per 10 minutes is formed in the high melt index reactor and an ethylene copolymer having a melt index in the range of about 0.001 to about 1 gram per 10 minutes is formed in the low melt index reactor, each copolymer having a density of about 0.860 to about 0.965 gram per cubic centimeter and a melt flow ratio in the range of about 22 to about 70, with the provisos that:

(a) the mixture of ethylene copolymer matrix and active catalyst formed in the first reactor in the series is transferred to the second reactor in the series;

(b) other than the active catalyst referred to in proviso (a) and the cocatalyst referred to in proviso (e), no additional catalyst is introduced into the second reactor;

(c) in the high melt index reactor:
  (1) the alpha-olefin is present in a ratio of about 0.01 to about 3.5 moles of alpha-olefin per mole of ethylene; and
  (2) hydrogen is present in a ratio of about 0.05 to about 3 moles of hydrogen per mole of combined ethylene and alpha-olefin;

(d) in the low melt index reactor:
  (1) the alpha-olefin is present in a ratio of about 0.02 to about 3.5 moles of alpha-olefin per mole of ethylene; and
  (2) hydrogen is, optionally, present in a ratio of about 0.0001 to about 0.5 mole of hydrogen per mole of combined ethylene and alpha-olefin; and (e) additional hydrocarbyl aluminum cocatalyst is introduced into the second reactor in an amount sufficient to restore the level of activity of the catalyst transferred from the first reactor to about the initial level of activity in the first reactor.

While the in situ blends prepared as above and the films produced therefrom are found to have the advantageous characteristics heretofore mentioned, there is a desire to fine tune certain properties without making major changes in polymerization conditions. This is of particular importance when one considers the fact that in an in situ blend system such as described, typically two independent reaction systems are linked. Thus, changes in the first reactor propagate to the second reactor over a prolonged time period making control of product properties technically difficult. In addition, in commercial operations, the absolute raw material purity can fluctuate from time to time, causing changes in polymer properties. The invention allows one to more rapidly respond to these changes without prolonged waiting periods for changes in reaction conditions to take effect in both reactors.

DISCLOSURE OF THE INVENTION

An object of this invention, therefore, is to provide a process for preparing an in situ blend in which melt flow ratio is adjusted in-line without changing the more difficult to control variables such as the mass ratio of polymer produced in the first reactor compared to the second reactor and other polymerization conditions such as ethylene partial pressure, cocatalyst feed rates, comonomer/ethylene ratio, hydrogen/ethylene ratio and reaction temperatures. One important physical property of the granular polymer, bulk density, can also be controlled in-line using this technology. This allows for more facile control of reactor residence times while changing only catalyst variables. As mentioned above, the ability to manipulate catalyst formulation directly to compensate for fluctuating raw material purity is also a distinct advantage. Other objects and advantages will become apparent hereinafter.

According to the present invention, such a process has been discovered. The process entails the in situ blending of polymers comprising contacting ethylene and one or more comonomers in two or more fluidized bed reactors connected in series, under polymerization conditions, with a catalyst system comprising (i) a supported or unsupported magnesium/titanium based precursor containing an electron donor and (ii) a hydrocarbyl aluminum cocatalyst in sufficient amount to complete the activation of the precursor. The invention lies in an improvement to this process comprising (A) increasing or decreasing the melt flow ratio and/or molecular weight of the blend by, respectively, decreasing or increasing the mole ratio of a precursor activator compound to the electron donor; and/or (B) increasing or decreasing the bulk density of the blend by, respectively, increasing or decreasing the molar ratio of a precursor activator compound to the electron donor with the following provisos:

(I) the mole ratio of the precursor activator compound to the electron donor is in the range of about 0.1:1 to about 1:1;

(II) the precursor activator compound can be one compound or a sequential mixture of two different compounds;

(III) each precursor activator compound has the formula $M(R_n)X_{(3-n)}$ wherein M is Al or B; each X is independently chlorine, bromine, or iodine; each R is independently a saturated aliphatic hydrocarbon radical having 1 to 14 carbon atoms, provided that when M is Al, n is 1 to 3 and when M is B, n is 0 to 1.5;

(IV) the activation of the precursor is carried out prior to the introduction of the precursor into the reactor; and (V) the activation in proviso(IV) is partial.

Another embodiment of this invention lies in an improvement to this process comprising (A) increasing or decreasing the melt flow ratio and/or molecular weight of the blend by, respectively, increasing or decreasing the molar ratio of a second precursor activator compound to a first precursor activator compound with the following provisos:

(I) the mole ratio of the second precursor activator compound to first precursor activator compound is in the range of about 1:1 to about 6:1;

(II) the two precursor activator compounds are a sequential mixture wherein the first precursor activator compound is the first in the sequence and the second precursor activator compound is the second in the sequence;

(III) each precursor activator compound has the formula $M(R_n)X_{(3-n)}$ wherein M is Al or B; each X is independently chlorine, bromine, or iodine; each R is independently a saturated aliphatic hydrocarbon radical having 1 to 14 carbon atoms; and n is 1 to 3;

(IV) the activation of the precursor is carried out prior to the introduction of the precursor into the reactor; and (V) the activation in proviso(IV) is partial.

DESCRIPTION OF THE PREFERRED EMBODIMENT(S)

The blend can be produced in two staged reactors connected in series wherein a mixture of resin and active catalyst is transferred from the first reactor to the second reactor in which another polymer is prepared and blends in situ with the copolymer from the first reactor. More than two reactors can be used in this process if desired. The reactors can be independent reactors or stages within one reactor.

The gaseous materials used in the process can be introduced into the reactors via a recycle gas. The recycle gas is defined as a mixture of gases including ethylene per se or ethylene and one or more alphao-lefins, preferably one or two alpha-olefins, as comonomers (alpha-olefin is required in the first reactor recycle gas and is optional in the second reactor recycle gas), and, optionally, one or more inert gases such as nitrogen (to make up the desired reactor pressure), inert hydrocarbons, and hydrogen. The alpha-olefins can be, for example, propylene, 1-butene, 1-hexene, 4-methyl-1-pentene, and 1-octene. The alpha-olefins usually have no more than 12 carbon atoms, preferably 3 to 8 carbon atoms. The recycle gas can also be referred to as the inlet gas or cycle gas.

Preferred comonomer combinations are:

| first reactor | second reactor |
| --- | --- |
| 1-hexene | 1-hexene |
| 1-butene | 1-hexene |
| 1-butene | 1-butene |
| 1-hexene | 1-butene |

The 1-hexene/1-hexene combination is found to give the best film properties, however 1-hexene/1-butene copolymer films are very similar in film properties to the 1-hexene/1-hexene combination and can be produced at substantially lower overall cost. It is noted that an ethylene homopolymer can be made in the first or second reactors, preferably the second, if desired.

It will be understood that generally the in situ blend can be characterized as a bimodal resin. In some cases, however, the two components making up the blend are sufficiently close in average molecular weight that there is no discernible discontinuity in the molecular weight curve.

The properties of bimodal resins are strongly dependent on the proportion of the high molecular weight component, i.e., the low melt or flow index component. For a staged reactor system, the proportion of the high molecular weight component is controlled via the relative production rate in each reactor. The relative production rate in each reactor can, in turn, be controlled by a computer application program, which monitors the production rate in the reactors (measured by heat balance) and then manipulates the ethylene partial pressure in each reactor and catalyst feed rate in order to meet the production rate, the production rate split, and catalyst productivity requirements. An advantage of the process of this invention is that these parameters do not have to be adjusted in order to change the melt flow ratio or the bulk density.

The catalyst system can be exemplified by the magnesium/titanium catalyst system described in U.S. Pat. No. 4,302,565. Another catalyst system is one where the precursor is formed by spray drying and used in slurry form. Such a catalyst precursor, for example, contains titanium, magnesium, and an electron donor, and, optionally, an aluminum halide. The precursor is then introduced into a hydrocarbon medium such as mineral oil to provide the slurry form. This spray dried catalyst is described in U.S. Pat. No. 5,290,745. These catalyst systems can be referred to as Ziegler-Natta catalyst systems.

A typical magnesium/titanium based catalyst system can be described as follows:

The precursor can have the formula $M_{gd}Ti(OR)_eX_f(ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is 1.5 d+2. It is prepared from a titanium compound, a magnesium compound, and an electron donor. Titanium compounds, which are useful in preparing these precursors, have the formula $Ti(OR)_eX_h$ wherein R, X, and e are as defined above for component (a); h is an integer from 1 to 4; and e+h is 3 or 4. Some specific examples of titanium compounds are $TiCl_3$, $TiCl_4$, $Ti(OC_2H_5)_2 Br_2$, $Ti(OC_6H_5) Cl_3$, $Ti(OCOCH_3) Cl_3$,; $TiCl_4$; $Ti(OC_2H_5)_2 Br_2$; $Ti(OC_6H_5) Cl_3$; $Ti(OCOCH_3) Cl_3$; and $Ti(OCOC_6H_5) Cl_3$. $TiCl_3$ and $TiCl_4$ are preferred compounds. The magnesium compounds include magnesium halides such as $MgCl_2$, $MgBr_2$, and $MgI_2$. Anhydrous $MgCl_2$ is a preferred compound. About 0.5 to about 56, and preferably about 1 to about 10, moles of the magnesium compounds are used per mole of titanium compound.

The electron donor is an organic Lewis base, liquid at temperatures in the range of about 0 degrees C. to about 200 degrees C., in which the magnesium and titanium compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, and ethyl propionate.

While an excess of electron donor is used initially to provide the reaction product of titanium compound and electron donor, the reaction product finally contains about 1 to about 20 moles of electron donor per mole of titanium compound and preferably about 1 to about 10 moles of electron donor per mole of titanium compound.

The precursor activator compound used in the partial pre-activation step can be one compound or a mixture of two different compounds. Each compound can have the formula $M(R_n)X_{(3-n)}$ wherein M is Al or B; each X is independently chlorine, bromine, or iodine; each R is independently a saturated aliphatic hydrocarbon radical having 1 to 14 carbon atoms, provided that when M is Al, n is 1 to 3 and when M is B, n is 0 to 1.5. Examples of the R radical are methyl, ethyl, n-butyl, isobutyl, n-hexyl and n octyl. Examples of n when M is aluminum are 1, 1.5, 2 and 3. Examples of n when M is boron are 0, 1 or 1.5. Preferred activator compounds include diethyl aluminum chloride, triethyl aluminum, tri-n-hexyl aluminum, dimethyl aluminum chloride, and tri-n-octyl aluminum. Particularly preferred activator compounds are: a sequential mixture of tri-n-hexylaluminum and diethylaluminum chloride; a sequential mixture of triethylaluminum and diethylaluminum chloride;a sequential mixture of diethylaluminum chloride and tri-n-hexylaluminum; a sequential mixture of diethylaluminum chloride and triethylaluminum; and either diethyl aluminum chloride or tri-n-hexyl aluminum.

Additionally, the relative ratio of the two precursor activator compounds to each other can be manipulated to effect MFR and to a lesser extent, hexane extractables. When using the precursor activator compound ratio to effect control of MFR or hexane extractables, it is preferred to have the first precursor activator compound (Activator 1) of the formula $AlR_3$ and the second precursor activator compound (Activator 2) of formula $M(R_n)X_{(3-n)}$ wherein R, M, and X are the same as above and n is 1 to 3. Particularly preferred examples of precursor activator compound 1 and precursor activator compound 2 are:

| Activator 1 | Activator 2 |
|---|---|
| Al(n-hexyl)$_3$ | Al(ethyl)$_2$Cl |
| Al(ethyl)$_3$ | Al(ethyl)$_2$Cl |
| Al(ethyl)$_2$Cl | Al(ethyl)$_3$ |
| Al(ethyl)$_2$Cl | Al(n-hexyl)$_3$ |

Preferred mole ratios of Activator 2/Activator 1 range from about 1:1 to about 6:1. Increasing the ratio increases MFR while decreasing the ratio decreases MFR.

The partial activation of the precursor is carried out prior to the introduction of the precursor into the reactor. The partially activated catalyst can function as a polymerization catalyst but at greatly reduced and commercially unsuitable catalyst productivity. Complete activation in the polymerization reactor by additional cocatalyst is required to achieve full activity.

In a preferred mode (sometimes referred to as an in-line reduction system), the precursor is introduced into a hydrocarbon solvent slurry feed tank; the slurry then passes to a static mixer immediately downstream of an activator injection port where the slurry is mixed with the activator; then the mixture passes to a second static mixer immediately downstream of a second activator injection port where it is mixed with the second activator. The static mixers are positioned vertically. Acceptable mixing can be provided by a 2 foot (32 element) Kenics™ static mixer. This low energy mixer functions by constantly dividing the flow and reversing flow directions in a circular pattern in the direction of the flow in the tube associated with the mixer. Depending on the activator compound used, some reaction time may be required for the reaction of the activator compound with the catalyst precursor. This is conveniently done using a residence time zone, which can consist either of an additional length of slurry feed pipe or an essentially plug flow holding vessel. A residence time zone can be used for both activator compounds, for only one or for neither, depending entirely on the rate of reaction between activator compound and catalyst precursor. The entire mixture is then introduced into the reactor, in this case, the first reactor, where the activation is completed by the cocatalyst. The partial activation is normally effected at temperatures in the range of about 10 to about 60 degrees C., preferably about 30 to about 45 degrees C. The mole ratio of each precursor activator compound to electron donor can be within the range of about 0.1:1 to about 1:1. The mole ratio of the precursor activator compounds in toto to electron donor can also be within the range of about 0.1:1 to about 1:1. The mole ratio of activator to titanium can be in the range of about 1:1 to about 8:1 and is preferably in the range of about 2:1 to about 5:1.

The hydrocarbon used for the formation of the slurry can be any essentially air and moisture free aliphatic or aromatic hydrocarbon which is unreactive with both the catalyst precursor composition and the catalyst activator compounds the catalyst precursor, the precursor activator compounds, and the cocatalyst. In practice, since many of the final polymer products find end uses in food packaging, aromatic hydrocarbons would not be a preferred slurry solvent. The hydrocarbon slurry solvent is typically chosen from hydrogenated "mineral oils" or naphthenic oils of relatively high viscosity to minimize settling of catalyst solids in feed tubes and the like, although, with appropriate engineering design, lower viscosity solvents such as isopentane, hexane, and heptane can be used as slurry solvents. These are not particularly preferred due to the additional complexity introduced by use of a lower viscosity and more easily settled slurry as catalyst. The viscosity of the hydrocarbon slurry solvent is sufficiently low so that the slurry can be conveniently pumped through the pre-activation apparatus and eventually into the polymerization reactor. Preferred solvents are aliphatic hydrocarbons with viscosity greater than about 50 centipoises (cps), particularly greater than about 100 cps and less than about 5,000 cps. Particulary preferred solvents are napthenic mineral oils typified by materials such as the Kaydol series of food grade mineral oils supplied by Witco under the trademark Kaydol® 350 and 550.

The cocatalyst, generally a hydrocarbyl aluminum cocatalyst, can be represented by the formula $R_3$ Al or $R_2$ AlX wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum hydride, di-isobutyl-hexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, diisobutylaluminum chloride, and ethylaluminum sesquichloride. Cocatalyst is introduced in a sufficient amount to provide, in addition to the molar ratio of activator to titanium mentioned above, a cocatalyst to titanium mole ratio of about 10:1 to about 100:1, preferably about 20:1 to about 50:1. This amount will complete the activation of the precursor.

It is preferred not to use a support. However, in those cases where it is desired to support the precursor, silica is the preferred support. Other suitable supports are inorganic oxides such as aluminum phosphate, alumina, silica/alumina mixtures, silica modified with an organoaluminum compound such as triethylaluminum, and silica modified with diethyl zinc. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of titanium per gram of support and preferably about 0.4 to about 0.9 millimole of titanium per gram of support. Impregnation of the above mentioned catalyst precursor into a silica support can be accomplished by mixing the precursor and silica gel in the electron donor solvent or other solvent followed by solvent removal under reduced pressure. The resultant solid catalyst is then converted into a free flowing slurry with an aliphatic hydrocarbon as described above such that it is pumpable as a liquid into the process. Catalyst precursors such as those described in U.S. Pat. No. 5,290,745 and European Patent Application 771 820 are particularly useful in the process of subject invention when placed into a hydrocarbon slurry in the unactivated state.

As noted, the precursor is partially activated before polymerization. Activation is completed in the reactor via the cocatalyst. The cocatalyst is preferably added separately neat or as a solution in an inert solvent, such as isopentane, to the polymerization reactor at the same time as the flow of ethylene is initiated.

The entire catalyst system, which includes the partially activated precursor and the cocatalyst, is added to the first reactor. The catalyst system, i.e., the partially activated precursor and the cocatalyst, is admixed with the copolymer or homopolymer produced in the first reactor, and the mixture is transferred to the second reactor. Insofar as the catalyst system is concerned, only cocatalyst, if desired, is added to the second reactor from an outside source.

The polymerization in each reactor is conducted in the gas phase using a continuous fluidized bed process.

A relatively low melt or flow index (or high molecular weight) copolymer is usually prepared in the first reactor. The mixture of polymer and an active catalyst is preferably transferred from the first reactor to the second reactor via an interconnecting device using nitrogen or second reactor recycle gas as a transfer medium. Alternatively, the low molecular weight copolymer can be prepared in the first reactor and the high molecular weight copolymer can be prepared in the second reactor.

In the high molecular weight reactor:

Because of the low values, instead of melt index, flow index is determined and those values are used in this specification. The flow index can be in the range of about 0.01 to about 50 grams per 10 minutes, and is preferably in the range of about 0.2 to about 12 grams per 10 minutes. The molecular weight of this polymer is, generally, in the range of about 135,000 to about 445,000. The density of the copolymer can be at least 0.860 gram per cubic centimeter, and is preferably in the range of 0.890 to 0.940 gram per cubic centimeter. The melt flow ratio of the polymer can be in the range of about 12 to about 70, and is preferably about 14 to about 45.

Melt index is determined under ASTM D-1238, Condition E. It is measured at 190° C. and 2.16 kilograms and reported as grams per 10 minutes or decigrams per minute. Flow index is determined under ASTM D-1238, Condition F. It is measured at 190° C. and 10 times the weight used in determining the melt index, and reported as grams per 10 minutes or decigrams per minute. Melt flow ratio is the ratio of flow index to melt index.

In the low molecular weight reactor:

A relatively high melt or flow index (or low molecular weight) copolymer is prepared in this reactor. The high melt index can be in the range of about 0.5 to about 3000 grams per 10 minutes, and is preferably in the range of about 1 to about 1000 grams per 10 minutes. The molecular weight of the high melt index copolymer is, generally, in the range of about 15,800 to about 35,000. The density of the copolymer prepared in this reactor can be at least 0.900 gram per cubic centimeter, and is preferably in the range of 0.910 to 0.975 gram per cubic centimeter. The melt flow ratio of this copolymer can be in the range of about 12 to about 70, and is preferably about 14 to about 45.

The blend or final product, as removed from the second reactor, can have a melt index in the range of about 0.02 to about 3.5 grams per 10 minutes, and preferably has a melt index in the range of about 0.04to about 2.0 grams per 10 minutes. The melt flow ratio is in the range of about 30 to about 150, and is preferably in the range of about 35 to about 145. The molecular weight of the final product is, generally, in the range of about 90,000 to about 450,000. The density of the blend can be at least 0.910 gram per cubic centimeter, and is preferably in the range of 0.916 to 0.960 gram per cubic centimeter. The bulk density can be in the range of about 18 to about 30 pounds per cubic foot, and is preferably greater than 22 pounds per cubic foot. Within the melt flow ratio range and the bulk density range, both can be adjusted up or down by changing the molar ratio of the precursor activator compound to the electron donor in a preactivation step as described above.

The blend has a broad molecular weight distribution which, as noted, can be characterized as bimodal. The broad molecular weight distribution is reflected in an Mw/Mn ratio of about 4 to about 40, preferably about 6 to about 30. Mw is the weight average molecular weight; Mn is the number average molecular weight; and the Mw/Mn ratio can be referred to as the polydispersity index, which is a measure of the breadth of the molecular weight distribution.

The weight ratio of copolymer prepared in the high molecular weight reactor to copolymer prepared in the low molecular weight reactor can be in the range of about 30:70 to about 80:20, and is preferably in the range of about 40:60 to about 60:40. This is also known as the split.

The transition metal based catalyst system including the cocatalyst, ethylene, alpha-olefin, and, optionally, hydrogen are continuously fed into the first reactor; the polymer/active catalyst mixture is continuously transferred from the first reactor to the second reactor; ethylene and, optionally, alpha-olefin and hydrogen, and cocatalyst are continuously fed to the second reactor. The final product is continuously removed from the second reactor. A preferred mode is to take batch quantities of product from the first reactor, and transfer these to the second reactor using the differential pressure generated by the recycle gas compression system. A system similar to that described in U.S. Pat. No. 4,621,952 is particularly useful.

In the low melt index (as reflected in flow index) reactor, preferably the first reactor:

The mole ratio of alpha-olefin to ethylene can be in the range of about 0.01:1 to about 0.8:1, and is preferably in the range of about 0.02:1 to about 0.35:1. The mole ratio of hydrogen (if used) to ethylene can be in the range of about 0.001:1 to about 0.3:1, and is preferably in the range of about 0.01 to about 0.2:1. Preferred operating temperatures vary depending on the density desired, i.e., lower temperatures for lower densities and higher temperatures for higher densities.

In the high melt or flow index reactor, preferably the second reactor:

The mole ratio of alpha-olefin (optional) to ethylene can be in the range of about 0.005:1 to about 0.6:1, and is preferably in the range of about 0.01:1 to about 0.42:1. The mole ratio of hydrogen (optional) to ethylene can be in the range of about 0.01:1 to about 3:1, and is preferably in the range of about 0.5:1 to about 2.2:1. The operating temperature is generally in the range of about 70° C. to about 110° C. As mentioned above, the temperature is preferably varied with the desired density.

The pressure is about the same in both the first and second reactors. Depending on the specific method used to transfer the mixture of polymer and contained catalyst from the first reactor to the second reactor, the second reactor pressure may be either higher than or somewhat lower than that of the first. If the second reactor pressure is lower, this pressure differential can be used to facilitate transfer of the polymer catalyst mixture from Reactor 1 to Reactor 2. If the second reactor pressure is higher, the differential pressure across the cycle gas compressor may be used as the motive force to move polymer. The pressure, i.e., the total pressure in the reactor, can be in the range of about 200 to about 500 psig (pounds per square inch gauge) and is preferably in the range of about 280 to about 450 psig. The ethylene partial pressure in the first reactor can be in the range of about 10 to about 150 psig, and is preferably in the range of about 20 to about 80 psig. The ethylene partial pressure in the second reactor is set according to the amount of copolymer it is desired to produce in this reactor to achieve the split mentioned above. It is noted that increasing the ethylene partial pressure in the first reactor leads to an increase in ethylene partial pressure in the second reactor. The balance of the total pressure is provided by alpha-olefin other than ethylene and an inert gas such as nitrogen. Other inert hydrocarbons, such as an induced condensing agent e.g., isopentane, hexane also contribute to the overall pressure in the reactor according to their vapor pressure under the temperature and pressure experienced in the reactor.

A typical fluidized bed reactor can be described as follows:

The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate.

A typical fluidized bed reactor is further described in U.S. Pat. No. 4,482,687.

The gaseous feed streams of ethylene, other gaseous alpha-olefins, and hydrogen, when used, are preferably fed to the reactor recycle line as well as liquid alpha-olefins and the cocatalyst solution. Optionally, the liquid cocatalyst can be fed directly to the fluidized bed. The partially activated catalyst precursor is preferably injected into the fluidized bed as a solid or a mineral oil slurry. Activation is completed in the reactors by the cocatalyst. The product composition can be varied by changing the molar ratios of the comonomers introduced into the fluidized bed. The product is continuously discharged in granular or particulate form from the reactor as the bed level builds up with polymerization. The production rate is controlled by adjusting the catalyst feed rate and/or the ethylene partial pressures in both reactors.

The hydrogen:ethylene mole ratio can be adjusted to control average molecular weights. The alpha-olefins (other than ethylene) can be present in a total amount of up to 15 percent by weight of the copolymer and, if used, are preferably included in the copolymer in a total amount of about 1 to about 10 percent by weight based on the weight of the copolymer.

The residence time of the mixture of reactants including gaseous and liquid reactants, catalyst, and resin in each fluidized bed can be in the range of about 1 to about 12 hours and is preferably in the range of about 2 to about 5 hours.

The reactors can be run in the condensing mode, if desired. The condensing mode is described in U.S. Pat. Nos. 4,543,399; 4,588,790; and 5,352,749.

The resin blend can be extruded into film in a conventional extruder adapted for that purpose. Extruders and processes for extrusion are described in U.S. Pat. Nos. 4,814,135;4,857,600; 5,076,988; and 5,153,382. Examples of various extruders, which can be used in forming the film are a single screw type such as one modified with a blown film die and air ring and continuous take off equipment, a blown film extruder, and a slot cast extruder. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and multiple heating zones from the rear heating zone to the front heating zone, the multiple sections and zones running from upstream to downstream. If it has more than one barrel, the barrels are connected in series. The length to diameter ratio of each barrel is in the range of about 16:1 to about 30:1. The extrusion can take place at temperatures in the range of about 160 to about 270 degrees C., and is preferably carried out at temperatures in the range of about 180 to about 240 degrees C.

The main advantage of the invention is found in providing the capability of manipulating the melt flow ratio and bulk density without changing the split or other parameters, i.e., the pre-reactor manipulation involving the activator/electron donor mole ratio is independent of the rest of the process. It is also found that there is the ability to control hexane extractables within certain ranges independent of other factors such as molecular weight and density which normally are the primary controls; the time for implementation of corresponding changes in the reactors is reduced; and there is a cost saving because another catalyst or a change of conditions in the reactors is not needed to accomplish the result. The capability to manipulate melt flow ratio independently of split ratio and other reaction variables is an important economic benefit of the invention. MFR (melt flow ratio) is important in overall polymer product design. The polymer system design requires balancing processability (extrudability and bubble stability), hexane extractables, and MD (machine direction) tear. The catalyst precursor preactivation step effects all of these. For MFR, as the activator:electron donor mole ratio is reduced, the MFR generally is increased on each component and the final product. This provides improved extrudability and bubble stability, but does so at the expense of higher extractables and lower MD tear. MFR can also be manipulated via other changes, notably in R1 and R2 reactor conditions or split ratio; both of these, however, take long time periods to reach steady state and require precise control.

Since the product is precisely designed for maximum performance required by the customer, there is a need to be able to control more precisely polymer MFR. Specifically if the MFR is too low, the extrudability and bubble stability are reduced and the utility of the product to the customer is decreased. If MFR is too high, hexane extractables will be too high for certain commercial uses and final polymer properties become deficient. The advantage of being able to control MFR within a relatively narrow range without changing split ratio is one object of the invention. This allows for control of the process such that one can remain in specification despite the usual fluctuations in feed rates, raw material purity, and the like that occur in commercial processes. The foregoing permits improved reaction process control, as MFR trends can be tracked and adjusted prior to needing to make split changes.

Similarly, polymer bulk density can be adjusted via manipulation of the partial activation ratios. Increasing the total partial activation will result in increased polymer bulk density, increasing the total amount of polymer in each reactor, which, at constant mass production rates, results in longer residence times, a more stable reaction system, and improved monomer efficiency. In periods of transition, from product to product, polymer bulk density can be decreased by this manipulation, decreasing the total amount of polymer in each reactor and resulting, again at constant production rate, in decreased transition time to the next product and overall a more economical process.

Conventional additives, which can be introduced into the blend, are exemplified by antioxidants, ultraviolet absorbers, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents. Aside from the fillers, the additives can be present in the blend in amounts of about 0.1 to about 10 parts by weight of additive for each 100 parts by weight of polymer blend. Fillers can be added in amounts up to 200 parts by weight and more for each 100 parts by weight of the blend.

Molecular weights are weight average molecular weights unless otherwise noted.

Patents, patent application, and other publications mentioned in this specification are incorporated by reference herein.

The invention is illustrated by the following examples.

EXAMPLES 1 to 8

A titanium trichloride catalyst precursor is prepared in a 1900 liter vessel equipped with pressure and temperature controls and a turbine agitator. A nitrogen atmosphere (less than 5 ppm $H_2O$) is maintained at all times.

1480 liters of anhydrous tetrahydrofuran (THF) containing less than 40 ppm $H_2O$ are added to the vessel. The THF is heated to a temperature of 50 degrees C., and 1.7 kilograms of granular magnesium metal (70.9 gram atoms) are added, followed by 27.2 kilograms of titanium tetrachloride (137 mols). The magnesium metal has a particle size in the range of from 0.1 to 4 millimeters. The titanium tetrachloride is added over a period of about one-half hour.

The mixture is continuously agitated. The exotherm resulting from the addition of titanium tetrachloride causes the temperature of the mixture to rise to approximately 72 degrees C. over a period of about three hours. The temperature is held at about 70 degrees C. by heating for approximately another four hours. At the end of this time, 61.7 kilograms of magnesium dichloride (540 moles) are added and heating is continued at 70 degrees C. for another eight hours. The mixture (solution) is then filtered through a 100 micron filter to remove undissolved magnesium dichloride and unreacted magnesium (less than 0.5 percent by weight).

100 kilograms of fumed silica having a particle size in the range of from 0.1 to 1 microns are added to the mixture prepared above over a period of about two hours. The mixture is stirred by means of a turbine agitator during this time and for several hours thereafter to thoroughly disperse the silica in the solution. The temperature of the mixture is held at 70 degrees C. throughout this period and a nitrogen atmosphere is maintained at all times.

The resulting slurry is spray dried using an 8-foot diameter closed cycle spray dryer equipped with a rotary atomizer. The rotary atomizer is adjusted to give catalyst particles with a D50 of 18 microns. The scrubber section of the spray dryer is maintained at approximately minus 4 degrees C.

Nitrogen gas is introduced into the spray dryer at an inlet temperature of 165 degrees C. and is circulated at a rate of approximately 1700 kilograms per hour. The catalyst slurry is fed to the spray dryer at a temperature of about 35 degrees C. and a rate of 90 to 95 kilograms per hour, or sufficient to yield an outlet gas temperature of approximately 125 degrees C. The atomization pressure is slightly above atmospheric. Discrete spray dried catalyst precursor particles are formed.

The spray dried catalyst precursor contains 2.5 weight percent Ti, 6.3 weight percent Mg, and 25 to 29 weight percent THF. The particles have a D50 of 18 microns and a span [(D90-D10)/D50] ranging from 0.75 to 1.25 as determined by means of a Leeds and Northrup Microtrac® particle size analyzer using a dodecane solvent, The discrete catalyst precursor particles are mixed with mineral oil under a nitrogen atmosphere in a 400 liter vessel equipped with a turbine agitator to form a slurry containing approximately 28 weight percent of the solid catalyst precursor.

To partially activate the catalyst slurry, a 50 weight percent solution of tri-n-hexylaluminum (TnHA) in mineral oil is added as the slurry is being pumped to the reactor. This mixture is held in a residence time vessel for roughly 1 to 4 hours, depending on the absolute feed rate of the catalyst. The TnHA solution is employed in an amount sufficient to provide 0.25 mole of TnHAl per mole of THF in the catalyst. Sequentially, then a 30 weight percent solution of diethylaluminum chloride (DEAC) in mineral oil is added and the mixture is held in another residence time vessel for roughly 1 to 4 hours, again depending on the absolute feed rate of the catalyst. The DEAC is employed in an amount sufficient to provide 0.50 mole of DEAC per mole of THF in the catalyst. The mole ratio of total activator (TnHAl plus DEAC) to THF is 0.75:1. The partially activated catalyst then exits the second residence time vessel and goes directly into the polymerization reactor where it is fully activated with the final amount of cocatalyst.

Ethylene is copolymerized with 1-hexene in the first of two fluidized bed reactors and 1-butene in the second. Each polymerization is continuously conducted after equilibrium is reached under conditions set forth in Table I. Polymerization is initiated in the first reactor by continuously feeding the above catalyst precursor and cocatalyst TMA (trimethylaluminum) into a fluidized bed of polyethylene granules together with ethylene, 1-hexene, and hydrogen. The cocatalyst is first dissolved in isopentane. The resulting copolymer mixed with active catalyst is withdrawn from the first reactor and transferred to the second reactor using second reactor gas as a transfer medium. The second reactor also contains a fluidized bed of polyethylene granules. Ethylene, 1-butene, and hydrogen are introduced into the second reactor where the gases come into contact with the polymer and catalyst from the first reactor. In the second reactor, the cocatalyst TMA is again introduced. The product blend is continuously removed.

Example 1 is repeated changing the activator/electron molar ratio. The TnHAl solution is employed in an amount sufficient to provide 0.20 mole of TnHAl per mole of THF in the catalyst. The DEAC is employed in an amount sufficient to provide 0.45 mole of DEAC per mole of THF in the catalyst. The mole ratio of total activator (TnHAl plus DEAC) to THF is 0.65:1. The reaction conditions are set forth in Table I. The MFR (melt flow ratio) and the bulk density are shown in Table II. It will be noted that the MFR and bulk density of the blend change with changes in the activator/electron mole ratio, but the split ratio and the other reaction conditions remain essentially the same.

TABLE I

| Examples | 1 | | 2 | |
|---|---|---|---|---|
| Reactor Conditions | R1 | R2 | R1 | R2 |
| Temperature (° C.) | 70.0 | 85.0 | 70.0 | 85.0 |
| Pressure (psig) | 294 | 435 | 282 | 435 |
| C2 PP (psi) | 42.8 | 109.7 | 42.7 | 112.8 |
| H2/C2 | 0.059 | 1.82 | 0.044 | 1.80 |
| C4/C2 | 0.017 | 0.23 | 0.004 | 0.26 |
| C6/C2 | 0.152 | 0.021 | 0.173 | 0.019 |
| iC5% | 5.4 | 2.4 | 4.4 | 1.5 |
| Cocatalyst Solution | 50% TMA | 50% TMA | 50% TMA | 50% TMA |
| Cocatalyst Flow (lbs/hr) | 10.5 | 6.3 | 9.0 | 3.6 |
| Production Rate (M lbs/hr) | 37 | 43 | 37 | 43 |
| Precursor Slurry feed (lbs/hr) | 22.0 | | 18.9 | |
| Residence Time (hr) | 2.6 | 2.2 | 2.6 | 2.3 |
| Bed Weight (M lbs) | 95 | 179 | 96 | 183 |
| SGV (ft/sec) | 1.8 | 2.2 | 1.8 | 2.1 |
| % Condensing | 6.9 | 0.0 | 6.5 | 0.0 |
| Prod. Rate Split | 0.46 | 0.54 | 0.46 | 0.54 |
| Added Al/Ti | 23 | 13.6 | 23 | 9.2 |
| Total added Al/Ti | — | 36.6 | — | 32.2 |
| Ti ppm in polymer | 4.16 | 1.93 | 3.57 | 1.65 |

TABLE II

| Examples | 1 | | 2 | |
|---|---|---|---|---|
| Resin Analysis | | | | |
| Melt Index (I2) | | 0.86 | | 0.85 |
| Flow Index (I21) | 1.90 | 84.3 | 1.80 | 86.7 |
| MFR (I2/I21) | | 98 | | 102 |
| Density | 0.9059 | 0.9219 | 0.9067 | 0.9216 |
| Bulk Density (lb/cu ft) | 19.8 | 25.6 | 20.8 | 26.7 |
| Average Particle Size (inch) | 0.032 | 0.030 | 0.032 | 0.034 |
| C6 Extractables (wt %) | | 3.84 | | 4.04 |

The above examples demonstrate the use of the invention to manipulate the variable MFR within narrow ranges, essentially taking material which would be "off-specification" into specification range by simple changes in the precursor reduction ratio in-line.

Examples 3 to 8 further illustrate the capability of the invention for control of MFR. In these examples, a smaller reaction system, as described in U.S. Pat. No. 5,665,818 and references contained therein, is used. Instead of manipulating the activator/electron donor ratios in an in-line fashion as practiced in Examples 1 and 2, the partially activated precursors are prepared in a batch fashion due to the extreme difficulty encountered in metering activator compound flows which would be at rates of about 1 to 3 cubic centimeters per hour. The unactivated precursor, however, is prepared in the same way as described in Example 1 above. These results are illustrative of the effect of the invention in manipulating polymer properties in an in-line fashion over a larger range of polymer MFR, hexane extractables, and polymer bulk density. The smaller reaction system is used illustratively to avoid experimentation in large commercial equipment which results in large amounts of off-specification polymer during the experiment. These results, however, are directly scalable to large scale commercial reaction systems. See Tables III and IV.

TABLE III

| Examples | 3 | | 4 | | 5 | |
|---|---|---|---|---|---|---|
| Reactor | R1 | R2 | R1 | R2 | R1 | R2 |
| CATALYST INFORMATION | | | | | | |
| Activator 1 | TnHAL | | TnHAL | | TnHAL | |
| Activator 2 | DEAC | | DEAC | | DEAC | |
| Activator 2/Activator 1 ratio | 1.77 | | 2.22 | | 2.75 | |
| Analysis | 0.39 | | 0.51 | | 0.22 | |
| A1/ED | 0.22 | | 0.23 | | 0.08 | |
| A2/ED | | | | | | |
| REACTION CONDITIONS | | | | | | |
| Temperature (C) | 70 | 85 | 70 | 85 | 70 | 85 |
| Pressure (Psia) | 303 | 350 | 307 | 350 | 307 | 347 |
| Comonomer Type | Hexene | Butene | Hexene | Butene | Hexene | Butene |
| C2 Partial Pressure (Psia) | 27.5 | 71.0 | 33.0 | 79.0 | 24.0 | 68.0 |
| H2/C2 Mole Ratio | .045 | 1.800 | .057 | 1.800 | .048 | 1.800 |
| C4/C2 Mole Ratio | .000 | .320 | .000 | .320 | .000 | .320 |
| C6/C2 Mole Ratio | .179 | .000 | .181 | .000 | .180 | .000 |
| Recycle iC5 Mole % | 11.7 | 2.5 | 11.4 | 2.4 | 11.0 | 2.1 |
| C2 Feed (lb/hr) | 19.0 | 25.0 | 19.0 | 27.0 | 18.5 | 24.0 |
| Slurry Catalyst Feed (E-6L/hr) | 5000 | 0 | 10000 | 0 | 5000 | 0 |
| Cocatalyst | 2% TMA | 1% TMA | 2% TMA | 1% TMA | 2% TMA | 1% TMA |
| Cocatalyst Feed Rate (cc/hr) | 135 | 120 | 150 | 100 | 100 | 100 |
| Individual Prod. Rate (lb/hr) | 25.0 | 29.3 | 25.0 | 33.1 | 25.0 | 28.2 |
| Prod. Rate Split | .46 | .54 | .43 | .57 | .47 | .53 |
| Titanium Split (%) | .47 | .53 | .45 | .55 | .45 | .55 |
| SGV (ft/sec) | 1.7 | 1.8 | 1.8 | 1.7 | 1.7 | 1.7 |
| Bed Weight (lbs) | 80.0 | 120.0 | 80.0 | 120.0 | 80.0 | 120.0 |
| Residence time (hrs) | 3.2 | 2.2 | 3.2 | 2.1 | 3.2 | 2.3 |
| RESIN PROPERTIES | | | | | | |
| Flow Index, I21 (dg/min) | 1.8 | 82.1 | 1.7 | 79.3 | 1.9 | 80.5 |
| Melt Index, I5 (dg/min) | — | — | — | — | — | — |
| Melt Index, I2 (dg/min) | — | .860 | — | .923 | — | .826 |
| Density (g/cm3) | .9060 | .9203 | .9076 | .9203 | .9053 | .9209 |
| MFR | — | 95.5 | — | 85.9 | — | 97.4 |
| Polymer Bulk Density | — | — | — | — | — | — |
| Residual Al (ppm) | 68 | 39 | 87 | 47 | 49 | 30 |
| Residual Ti (ppm) | 3.98 | 1.87 | 6.30 | 2.86 | 3.97 | 1.77 |
| Al/Ti Mole ratio | 30 | 37 | 24 | 29 | 22 | 30 |
| APS (inches) | .019 | .020 | .019 | .020 | .023 | .025 |
| Fines <120 mesh, (wt %) | 2.20 | 1.45 | 2.25 | 1.90 | 1.40 | .70 |
| Hexane Extractables | | 4.73 | | 4.08 | | 5.34 |

TABLE IV

| Examples | 6 | | 7 | | 8 | (3 Repeat) |
|---|---|---|---|---|---|---|
| Reactor | R1 | R2 | R1 | R2 | R1 | R2 |
| CATALYST INFORMATION | | | | | | |
| Activator 1 | TnHAL | | TnHAL | | TnHAL | |
| Activator 2 | DEAC | | DEAC | | DEAC | |
| Activator 2/Activator 1 ratio | 1.25 | | 5.0 | | 1.77 | |
| Analysis | 0.35 | | 0.50 | | 0.39 | |
| A1/ED | 0.28 | | 0.10 | | 0.22 | |
| A2/ED | | | | | | |
| REACTION CONDITIONS | | | | | | |
| Temperature (C) | 70 | 85 | 70 | 85 | 70 | 85 |
| Pressure (Psia) | 307 | 348 | 307 | 353 | 307 | 347 |
| Comonomer Type | Hexene | Butene | Hexene | Butene | Hexene | Butene |
| C2 Partial Pressure (Psia) | 30.0 | 75.0 | 26.5 | 77.0 | 28.0 | 73.0 |
| H2/C2 Mole Ratio | .058 | 1.800 | .044 | 1.800 | .046 | 1.800 |
| C4/C2 Mole Ratio | .000 | .320 | .000 | .305 | .000 | .305 |
| C6/C2 Mole Ratio | .195 | .000 | .188 | .000 | .190 | .000 |
| Recycle iC5 Mole % | 10.5 | 2.0 | 10.5 | 2.0 | 10.7 | 2.3 |
| C2 Feed (lb/hr) | 18.5 | 25.0 | 18.0 | 26.5 | 18.0 | 25.5 |
| Slurry Catalyst Feed (E-6L/hr) | 7000 | 0 | 5250 | 0 | 9750 | 0 |
| Co-catalyst | 2% TMA | 1% TMA | 2% TMA | 1% TMA | 2% TMA | 1% TMA |
| Cocatalyst Feed Rate (cc/hr) | 150 | 100 | 100 | 100 | 125 | 140 |
| Individual Prod. Rate (lb/hr) | 25.0 | 27.1 | 25.0 | 29.3 | 25.0 | 27.7 |
| Prod. Rate Split | .48 | .52 | .46 | .54 | .47 | .53 |
| Titanium Split (%) | .45 | .55 | .45 | .55 | .44 | .56 |
| SGV (ft/sec) | 1.7 | 1.7 | 1.7 | 1.7 | 1.7 | 1.7 |
| Bed Weight (lbs) | 80.0 | 120.0 | 80.0 | 120.0 | 80.0 | 120.0 |

TABLE IV-continued

| Examples | 6 | | 7 | | 8 (3 Repeat) | |
|---|---|---|---|---|---|---|
| Reactor | R1 | R2 | R1 | R2 | R1 | R2 |
| Residence time (hrs) | 3.2 | 2.3 | 3.2 | 2.2 | 3.2 | 2.3 |
| RESIN PROPERTIES | | | | | | |
| Flow Index, I21 (dg/min) | 1.8 | 85.9 | 1.8 | 84.0 | 1.8 | 78.9 |
| Melt Index, I5 (dg/min) | — | — | — | — | — | — |
| Melt Index, I2 (dg/min) | — | .942 | — | .813 | — | .828 |
| Density (g/cm3) | .9073 | .9203 | .9060 | .9211 | .9064 | .9201 |
| MFR | — | 91.2 | — | 103.3 | — | 95.3 |
| Polymer Bulk Density | — | — | — | — | — | — |
| Residual Al (ppm) | 79 | 42 | 51 | 31 | 76 | 46 |
| Residual Ti (ppm) | 6.04 | 2.69 | 3.96 | 1.76 | 5.40 | 2.38 |
| Al/Ti Mole ratio | 23 | 27 | 23 | 31 | 25 | 34 |
| APS (inches) | .017 | .018 | .024 | .025 | .018 | .019 |
| Fines <120 mesh, (wt %) | 2.45 | 1.30 | 1.13 | .70 | 2.60 | 1.70 |
| Hexane Extractables | | 4.45 | | 4.65 | | 4.91 |

Varying independently the Activator 1 and Activator 2 molar ratios to the electron donor compound allows manipulation of MFR and polymer bulk density while, at the same time, allowing control of catalyst productivity. Thus, using the invention, one can attain essentially the same MFR at two different sets of activator compound ratios (compare example 3 with example 5) while simultaneously changing the level of hexane extractables. Alternatively, one can use varying Activator 2/Activator 1 mole ratios (independently of the Activator/Electron donor ratio) to significantly change MFR (compare example 6 to example 7). One can also effect absolute hexane extractables levels by manipulating the total Activator (1+2)/Electron Donor ratio (compare example 3 with example 4). Other properties such as bulk density and catalyst productivity can be effected by modifying both the specific activator compound/electron donor mole ratio as well as the total activator/electron donor mole ratio and the Activator 2/Activator 1 mole ratio.

It is apparent from the examples that the capability to manipulate MFR by in-line control of activator compound/ electron donor mole ratios is demonstrated by the invention. Other embodiments of the invention, such as the ability to change polymer bulk density within the reaction system to either increase or decrease residence time within a fixed volume reactor while maintaining constant polymer properties and the ability to modify catalyst productivity while maintaining constant polymer properties are also illustrated by the examples.

Notes to Above Tables:
1. Resin properties are those for the final product exiting the reactor, i.e., R1 (first reactor) resin properties are those of the resin exiting R1 into R2 (second reactor) and R2 resin properties represent the total output from the R2 reactor, i.e., the blend.
2. Titanium split=the fraction of the total product produced in the first and second reactors based on titanium catalyst residue.
3. Prod. Rate Split=the fraction of the total product produced in the first and second reactors based on a production rate calculation and actual production rate from the second reactor
3. SGV=superficial gas velocity reported in feet per second.
4. Production rate=pounds of resin per hour.
5. Density is measured by producing a plaque in accordance with AS™ D-1928, procedure C, and then testing as is via ASTM D1505. The density is reported in gram per cubic centimeter.
6. C2 PP=ethylene partial pressure.
7. iC5=isopentane
8. Mlbs=1000 pounds
9. % Condensing=weight percent of total recycle gas with condenses in the cycle gas cooler
10. APS=average particle size in inches.
11. ED=electron donor
12. E-6 L/hr=$10^{-6}$ liters/hour or microliters/hour
13. comp split=production rate split calculated by heat balance by process control computer.
14. Added Al/Ti=mole ratio of cocatalyst to titanium.

What is claimed is:

1. In a process for the in situ blending of polymers comprising contacting ethylene and one or more comonomers in two or more fluidized bed reactors connected in series, under polymerization conditions, with a catalyst system comprising (i) a supported or unsupported magnesium/titanium based precursor containing an electron donor and (ii) a hydrocarbyl aluminum cocatalyst in sufficient amount to complete the activation of the precursor, the improvement comprising:
   (A) increasing or decreasing the melt flow ratio and/or molecular weight of the blend by, respectively, decreasing or increasing the mole ratio of a precursor activator compound to the electron donor; or
   (B) increasing or decreasing the bulk density of the blend by, respectively, increasing or decreasing the mole ratio of a precursor activator compound to the electron donor with the following provisos:
      (I) the mole ratio of the precursor activator compound to the electron donor is in the range of about 0.1:1 to about 1:1;
      (II) the precursor activator compound can be one compound or a sequential mixture of two different compounds;
      (III) each precursor activator compound has the formula $M(R_n)X_{(3-n)}$ wherein M is Al or B; each X is independently chlorine, bromine, or iodine; each R is independently a saturated aliphatic hydrocarbon radical having 1 to 14 carbon atoms, provided that when M is Al, n is 1 to 3 and when M is B, n is 0 to 1.5;
      (IV) the activation of the precursor is carried out prior to the introduction of the precursor into the reactor; and
      (V) the activation in proviso (IV) is partial.

2. The process defined in claim 1 wherein, in each precursor activator compound, the R radical is methyl, ethyl, n-butyl, isobutyl, n-hexyl or n-octyl; and n, when M is aluminum, is 1, 1.5, 2 or 3 and, when M is boron, is 0, 1, or 1.5.

3. The process defined in claim 1 wherein each catalyst activator compound is selected from the group consisting of triethyl aluminum, tri-n-butyl aluminum, tri-n-hexyl aluminum, tri-n-octyl aluminum, triisobutyl aluminum, trimethyl aluminum, diethyl aluminum chloride, dimethyl aluminum chloride, diisobutyl aluminum chloride, boron trichloride, and ethyl boron dichloride.

4. The process defined in claim 1 wherein the precursor activator compound is a sequential mixture of tri-n-hexylaluminum and diethylaluminum chloride. triethylaluminum and diethylaluminum chloride; or trimethylaluminum and dimethylaluminum chloride.

5. The process defined in claim 1 wherein there are two reactors and, after partial activation of the precursor,
    (a) ethylene is introduced into each reactor and one or more comonomers are introduced into at least one of the reactors;
    (b) the mixture of ethylene polymer matrix and active precursor formed in the first reactor in the series is transferred to the second reactor in the series;
    (c) other than the active precursor referred to in step (b), no additional precursor is introduced into the second reactor;
    (d) in the reactor in which a low melt or flow index copolymer is made:
        (1) subject to step (a), alpha-olefin is optionally present in a ratio of about 0.01 to about 0.8 mole of alpha-olefin per mole of ethylene; and
        (2) optionally, hydrogen is present in a ratio of about 0.001 to about 0.3 mole of hydrogen per mole of ethylene; and
    (e) in the reactor in which a high melt or flow index polymer is made:
        (1) subject to step (a), alpha-olefin is optionally present in a ratio of about 0.005 to about 0.6 mole of alpha-olefin per mole of ethylene; and
        (2) optionally, hydrogen is present in a ratio of about 0.2 to about 3 moles of hydrogen per mole of ethylene.

6. The process defined in claim 1 wherein the hydrocarbyl aluminum cocatalyst has the formulae $R_3Al$ or $R_2AlX$ wherein each R is independently alkyl, cycloalkyl, aryl, or hydrogen; at least one R is hydrocarbyl; each hydrocarbyl has 1 to 20 carbon atoms; two or three R radicals can be joined to form a heterocyclic structure; and X is chlorine, bromine, or iodine.

7. The process defined in claim 5 wherein the hydrocarbyl aluminum cocatalyst has the formulae $R_3Al$ or $R_2AlX$ wherein each R is independently alkyl, cycloalkyl, aryl, or hydrogen; at least one R is hydrocarbyl; each hydrocarbyl has 1 to 20 carbon atoms; two or three R radicals can be joined to form a heterocyclic structure; and X is chlorine, bromine, or iodine.

8. The process defined in claim 5 wherein the polymer formed in one reactor has a flow index in the range of about 0.01 to about 50 grams per 10 minutes and a density in the range of about 0.860 to about 0.940 gram per cubic centimeter and the polymer formed in the other reactor has a melt index in the range of about 5 to about 3000 grams per 10 minutes and a density in the range of about 0.900 to about 0.975 gram per cubic centimeter, the weight ratio of the high molecular weight copolymer to the low molecular weight polymer being in the range of about 30:70 to about 80:20.

9. The process defined in claim 5 wherein, in each precursor activator compound, the R radical is methyl, ethyl, n-butyl, isobutyl, n-hexyl or n-octyl; and n, when M is aluminum, is 1, 1.5, 2 or 3 and, when M is boron, is 0, 1, or 1.5.

10. The process defined in claim 5 wherein each catalyst activator compound is selected from the group consisting of tri-ethyl aluminum, tri-n-butyl aluminum, tri-n-hexyl aluminum, tri-n-octyl aluminum, triisobutyl aluminum, trimethyl aluminum, diethyl aluminum chloride, dimethyl aluminum chloride, diisobutyl aluminum chloride, boron trichloride, and ethyl boron dichloride.

11. The process defined in claim 5 wherein the precursor activator compound is a sequential mixture of tri-n-hexylaluminum and diethylaluminum chloride; triethylaluminum and diethylaluminum chloride; or trimethylaluminum and dimethylaluminum chloride.

12. In a process for the in situ blending of polymers comprising contacting ethylene and one or more comonomers in two or more fluidized bed reactors connected in series, under polymerization conditions, with a catalyst system comprising (i) a supported or unsupported magnesium/titanium based precursor containing an electron donor and (ii) a hydrocarbyl aluminum cocatalyst in sufficient amount to complete the activation of the precursor, the improvement comprising increasing or decreasing the melt flow ratio and/or molecular weight of the blend by, respectively, increasing or decreasing the molar ratio of a second precursor activator compound to a first precursor activator compound with the following provisos:
    (I) the mole ratio of the second precursor activator compound to first precursor activator compound is in the range of about 1:1 to about 6:1;
    (II) the two precursor activator compounds are a sequential mixture wherein the first precursor activator compound is the first in the sequence and the second precursor activator compound is the second in the sequence;
    (III) each precursor activator compound has the formula $M(R_n)X_{(3-n)}$ wherein M is Al or B; each X is independently chlorine, bromine, or iodine; each R is independently a saturated aliphatic hydrocarbon radical having 1 to 14 carbon atoms; and
    n is 1 to 3;
    (IV) the activation of the precursor is carried out prior to the introduction of the precursor into the reactor; and
    (V) the activation in proviso(IV) is partial.

13. The process defined in claim 12 wherein each mixture of second precursor activator compound and first precursor activator compound is selected from the group consisting, respectively, of tri-hexylaluminum and diethylaluminum chloride; triethyl aluminum and diethylaluminum chloride; diethylaluminum chloride and triethyl aluminum; and diethylaluminum chloride and tri-n-hexylaluminum.

* * * * *